United States Patent [19]
Schaldach

[11] Patent Number: 5,794,324
[45] Date of Patent: Aug. 18, 1998

[54] PALLET COUPLE AND DECOUPLE CLAMPING APPARATUS AND METHOD FOR PALLET COUPLING AND DECOUPLING

[75] Inventor: Kurt D. Schaldach, Strongsville, Ohio

[73] Assignee: Automation Enhancements Unlimited, Cleveland, Ohio

[21] Appl. No.: 435,970

[22] Filed: May 5, 1995

Related U.S. Application Data

[62] Division of Ser. No. 95,902, Jul. 22, 1993, Pat. No. 5,662,316.

[51] Int. Cl.[6] ........................................... B25B 1/18
[52] U.S. Cl. ..................... 29/559; 269/25; 269/309
[58] Field of Search ..................... 269/20, 25–34, 269/309; 29/559

[56] References Cited

U.S. PATENT DOCUMENTS

| | | | |
|---|---|---|---|
| 2,752,801 | 7/1956 | Olson | 269/20 |
| 3,186,173 | 6/1965 | Hogg | 265/25 |
| 3,603,579 | 9/1971 | Odom | 269/32 |
| 3,727,772 | 4/1973 | Pauls | 269/25 |
| 5,251,887 | 10/1993 | Arnold et al. | 269/136 |

*Primary Examiner*—Robert C. Watson
*Attorney, Agent, or Firm*—Woodling, Krost & Rust

[57] ABSTRACT

A method or automatically coupling and uncoupling a pallet clamping device and a pallet couple and decouple clamping device comprising air pressure supply means, vice means, pressure amplification means, a two position 4-way pilot valve, means for applying and removing air pressure to the pilot valve for controlling the amplification means which, in turn, locks and unlocks the vice means.

2 Claims, 10 Drawing Sheets

FIG. 7

PALLET COUPLE AND DECOUPLE CLAMPING APPARATUS AND METHOD FOR PALLET COUPLING AND DECOUPLING

This is a divisional of application Ser. No. 08/095,902 filed on Jul. 22, 1993 now U.S. Pat. No. 5,662,316.

FIELD OF THE INVENTION

This invention relates to an automatic pallet clamping device for automatically coupling and uncoupling a workpiece on a pallet. The pallet is a large work table which slides into and out of a machining center. The workpieces are secured in place during the machining process by locking them within a hydraulic vice, swing clamps or toe clamps. The vice is affixed to the pallet which slides into and out of the machining center. When the pallet and the vice are located inside the machining center, machining takes place on the workpiece. The pallet is brought out of the machining center for the purpose of either exchanging workpieces within the vice or inserting new workpieces in the vice.

BACKGROUND OF THE INVENTION

This invention involves a pilot operated pneumatically controlled pallet couple and decouple clamping system. There are systems currently available which employ only hydraulic fluid, and not air, in the system. Hydraulic systems are very expensive. Additionally, hydraulic systems are difficult to maintain in that leaks of hydraulic fluid are inevitable.

The present invention is very simple. The present invention does employ hydraulic fluid, however, said fluid is employed in a completely enclosed manner which prevents leaks. The present invention employs air couplings for the transfer of air pressure when the pallet is retracted outside of the machining center. This allows the clamping and unclamping of the workpieces in a very short amount of time and also prevents any fluid leakage in that the motive force, or power, is supplied through pneumatic air pressure rather than through a hydraulic fluid.

Also employed in the present invention is an amplification means or a power booster which is controlled with air pressure as the input and a hydraulic fluid pressure as the output to the hydraulic vice.

OBJECTS AND SUMMARY OF THE INVENTION

It is an object of the present invention to provide an inexpensive pallet couple and decouple clamping system. The present invention employs pneumatic couplings and means to communicate with a pilot control valve which in turn controls an amplification means. The amplification means then, in turn, controls a hydraulic vice.

It is a further object of the present invention to eliminate many of the complexities of the existing hydraulic systems used for pallet coupling and decoupling devices. Specifically, it is an object to eliminate such devices as hydraulic pumps and hydraulic accumulators.

It is a further object to eliminate hydraulic leaks. As previously stated, the hydraulic fluid in the present invention is self-contained in a completely closed manner. The hydraulic systems presently available employ connections which are made and broken with hydraulic fluid under pressure making leaks inevitable. Additionally, it is a further object of the present invention to provide a means for automatically coupling and decoupling quick disconnect pneumatic couplings for controlling and powering the system.

BRIEF DESCRIPTION OF THE DRAWINGS

FIG. 4 corresponds to FIG. 1 in regard to the position of the first and second mounting blocks and the disengaged state of the first and second pneumatic couplings.

FIG. 5 indicates that the check valve is off its seat and is supplying air to the regulator, etc.; FIG. 5 corresponds to FIG. 2 in regard to the position of the first and second mounting blocks and the engagement of the first pneumatic coupling.

FIG. 6 corresponds to FIG. 3 in regard to the position of the first and second mounting blocks and the engaged state of the first and second pneumatic couplings.

FIG. 7 is a perspective view of the invention including the piston, first and second mounting blocks, first and second pneumatic couplings, the metal conduit guide, the spring, all pneumatic and hydraulic conduits, the pneumatic pilot valve, the amplifier, the pallet and the hydraulic vice.

DETAILED DESCRIPTION OF THE INVENTION

Figure 4:
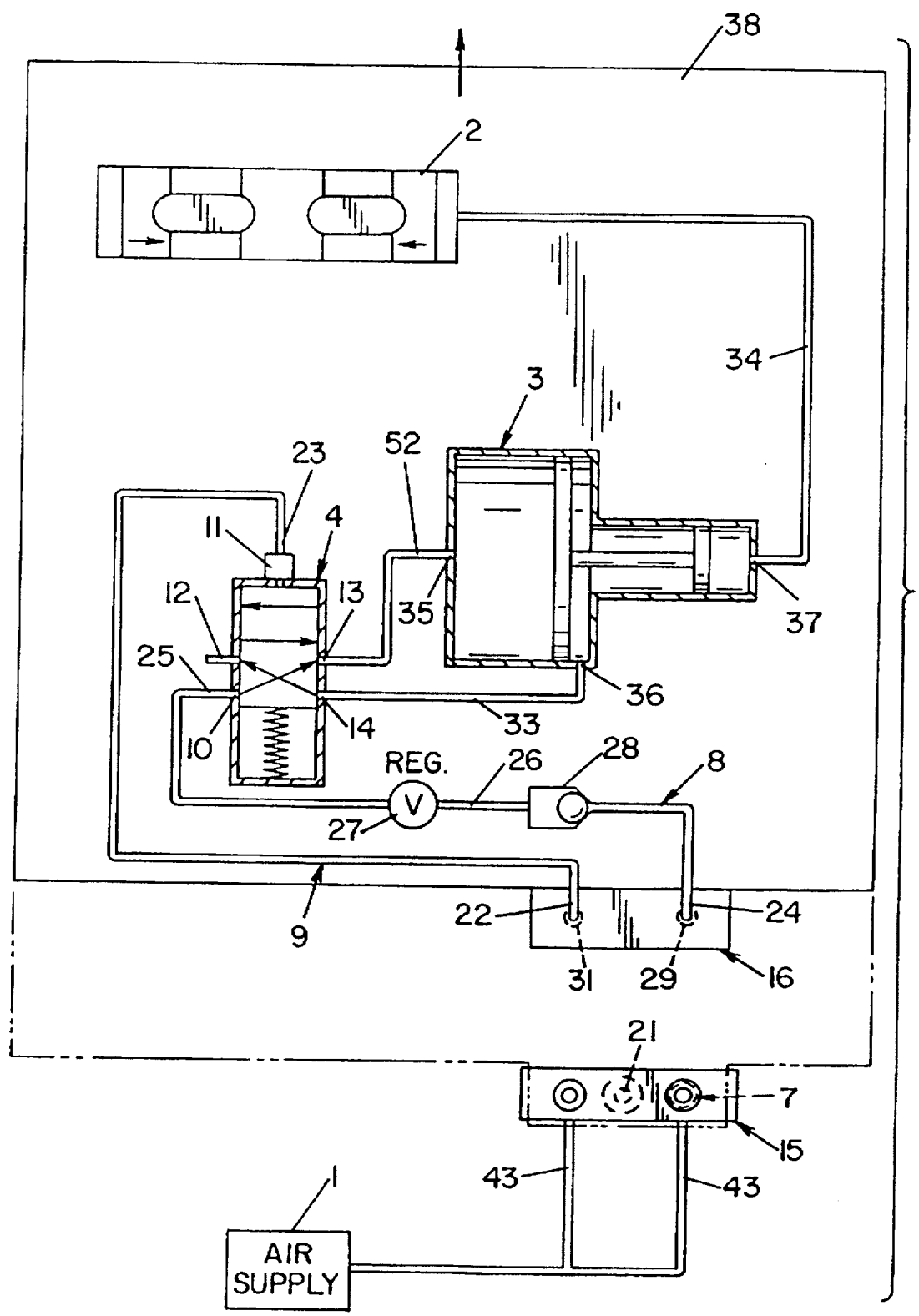
FIG. 4 is a schematic diagram of the invention shown with the air supply totally disconnected from the first and second pneumatic couplings, air having once been supplied through said first and second pneumatic couplings.
Figure 5:
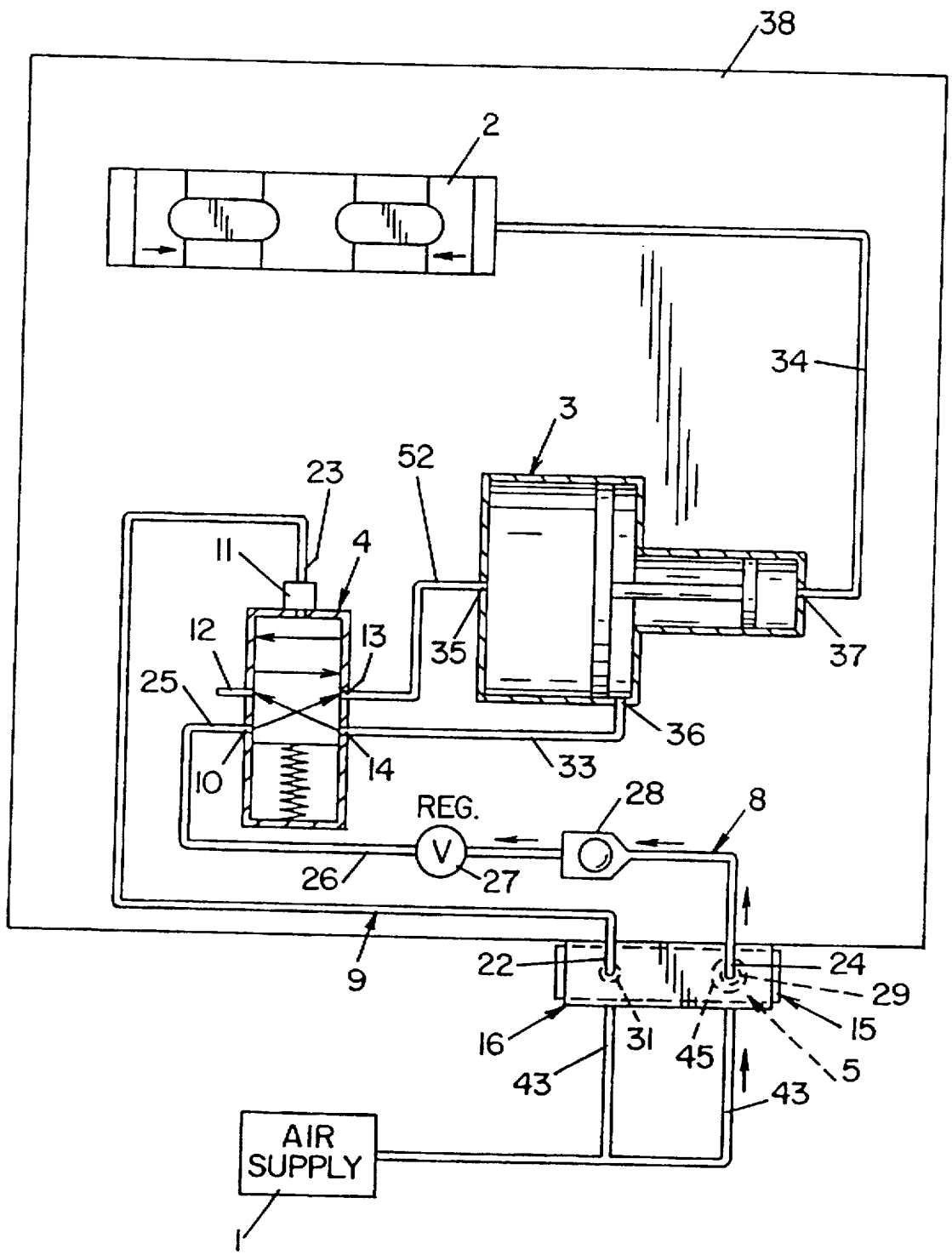
FIG. 5 is a portion of the schematic diagram of the invention as shown in FIG. 4 with the exception that air is being supplied through the first pneumatic coupling through the check valve and air pressure regulator.
Figure 6:
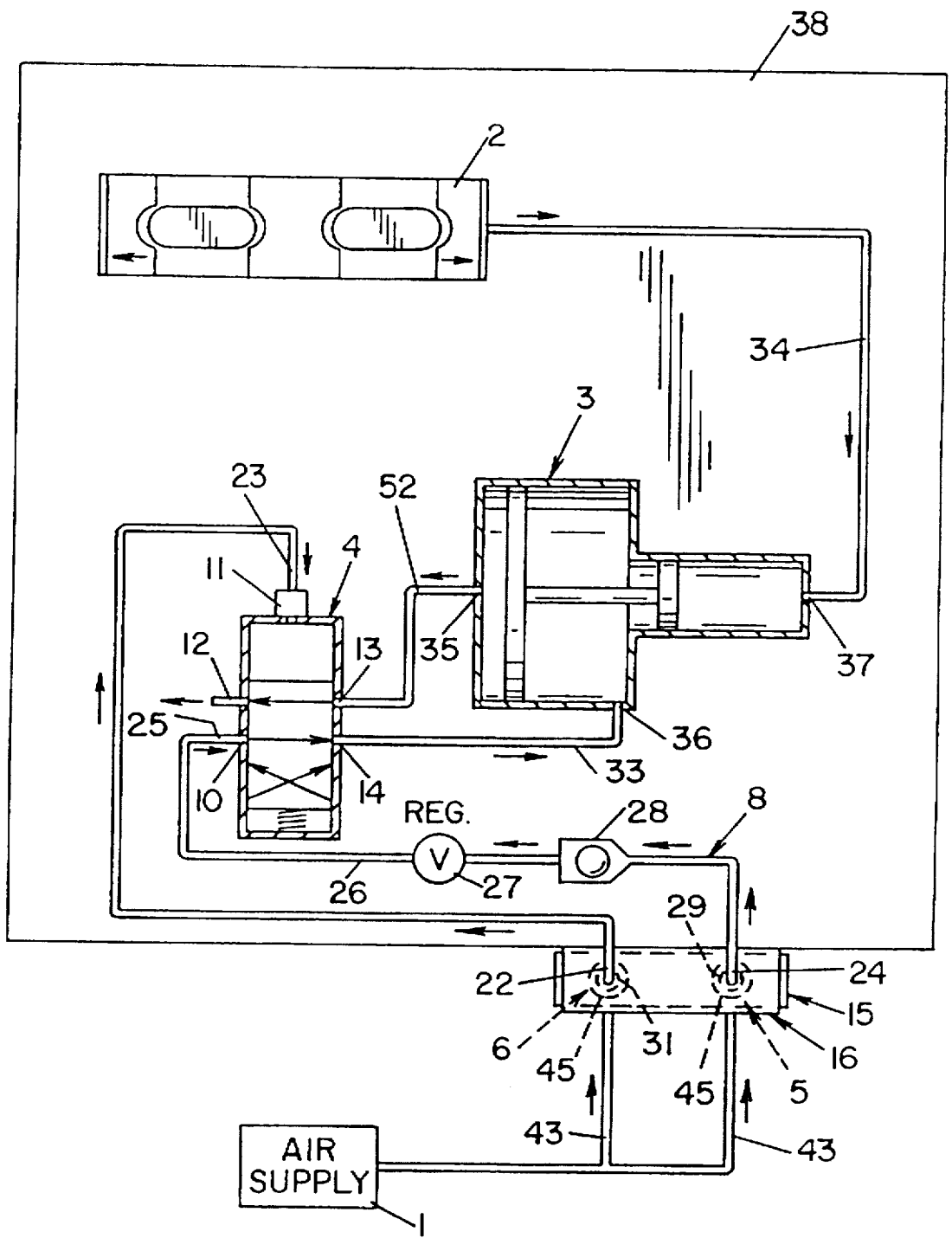
FIG. 6 is a schematic diagram of the invention shown with the air supply totally connected to the first and second pneumatic couplings.

The invention has as its end result the reliable, quick, and safe locking and unlocking of workpieces in a hydraulic vice 2. The preferred embodiment disclosed employs a hydraulic vice. A hydraulic vice is one type of device from a larger class of hydraulic clamping devices. However, it shall be understood to those skilled in the art that the present invention contemplates all hydraulic clamping devices. There are several devices which fall under the ambit of hydraulic clamping devices and include, but are not limited to, hydraulic vices, swing clamps and toes clamps. Therefore, the terms vice means and hydraulic vice as used hereinafter include all such hydraulic clamping devices. FIGS. 4, 5 and 6 schematically portray the present invention. A high gain pneumatic-hydraulic pressure amplifier 3 has two pneumatic ports, a clamped port 35 and a unclamped port 36. Additionally the pneumatic-hydraulic pressure amplifier 3 has a power port 37. Power port 37 transmits hydraulic pressure to the hydraulic vice 2. The hydraulic fluid is contained in the pneumatic-hydraulic pressure amplifier 3, the vice fluid conduit 34 and the vice 2.

The pneumatic-hydraulic pressure amplifier 3 is a high gain device meaning that the output fluid pressure is much higher than the input air pressure. For instance, the pneumatic-hydraulic pressure amplifier used in the preferred embodiment of the present invention has a 54 to 1 gain meaning that if 100 psig air pressure is applied to the clamped port 35 on pneumatic-hydraulic pressure amplifier 3, that 5400 psig hydraulic fluid pressure would be emitted from the power port 37 through said vice conduit 34 to said hydraulic vice 2. The pneumatic-hydraulic pressure amplifier used in the preferred embodiment of the present invention is sold under the trademark [VEKTEK].

The pneumatic-hydraulic pressure amplifier 3 has, as previously stated, a clamped port 35 and an unclamped port 36. Application of air pressure to these two ports controls the pneumatic-hydraulic pressure amplifier 3. When control air pressure is supplied to the clamped port 35 by way of the air supply power conduit 30, the pneumatic-hydraulic pressure amplifier causes high output pressure at the power port 37 to be conducted through the vice fluid conduit 34 with the result that the hydraulic vice 2 is locked. This locking takes place when the pallet 38 is withdrawn from the machining center. The workpiece remains locked when the pallet is sent into the machining center. When air pressure is applied to the unclamped port 36 on the pneumatic-hydraulic pressure amplifier 3, the pressure at the power port 37 is relieved and the hydraulic vice 2 is opened.

The pneumatic-hydraulic pressure amplifier 3 is controlled by the pneumatic pilot control valve 4. The pneumatic pilot control valve 4 has five ports, a power port 10, a control port 11, an exhaust port 12, an amplification port 13 and a retraction port 14. The power port 10 supplies air pressure to the clamped port 35 on said pneumatic-hydraulic pressure amplifier 3 through amplification conduit 32. Retraction conduit 33 connects the retraction port 14 of said pneumatic pilot control valve 4 to the unclamped port 36 on the pneumatic-hydraulic pressure amplifier.

The pneumatic control valve 4 is a two-position, four way valve. The pneumatic control valve and couplings used in the preferred embodiment of the present invention are products of SPEEDAIRE. The hydraulic vice used in the preferred embodiment is sold under the trademark [QWIK-LOK].

The function and operation of the pneumatic control valve can be readily understood from a review of FIGS. 4, 5 and 6. FIGS. 4 and 5 illustrate the position of the four way pilot valve when no pilot control air pressure is being applied to control port 11 on pilot valve 4. In the circumstance where no pilot control air pressure is applied to the pilot control valve 4, as shown in FIGS. 4 and 5, power port 10 is connected to amplification port 13 and retraction port 14 is connected to exhaust port 12. When no pilot control air is applied to the pilot control valve, this is known as the first position of the pneumatic-hydraulic pilot control valve. FIG. 6 illustrates the second position of the pneumatic pilot control valve 4 with pilot air applied to said pilot control valve. In FIG. 6, the power port 10 is connected to retraction port 14 and amplification port 13 is connected to exhaust port 12.

The position of pneumatic pilot control valve 4 is dictated by whether or not air pressure is supplied to control port 11 on pneumatic pilot control valve 4. Application of air pressure to pneumatic pilot control valve 4 is controlled by certain pneumatic conduits in conjunction with certain pneumatic couplings and a first mounting block 15 and second mounting block 16. The second mounting block 16 has an air supply power conduit 8 and an air supply control conduit 9. Additionally, the second mounting block 16 has a male half of a first quick disconnect 29 and a male half of a second quick disconnect 31 affixed thereto. The male half of the first quick disconnect 29 and the male half of the second quick disconnect 31 are parts of the first pneumatic coupling 5 and the second pneumatic coupling 6, respectively. The first pneumatic coupling is also referred to herein as a first quick disconnect and the second pneumatic coupling is also referred to herein as a second quick disconnect.

Figures 9, 10:
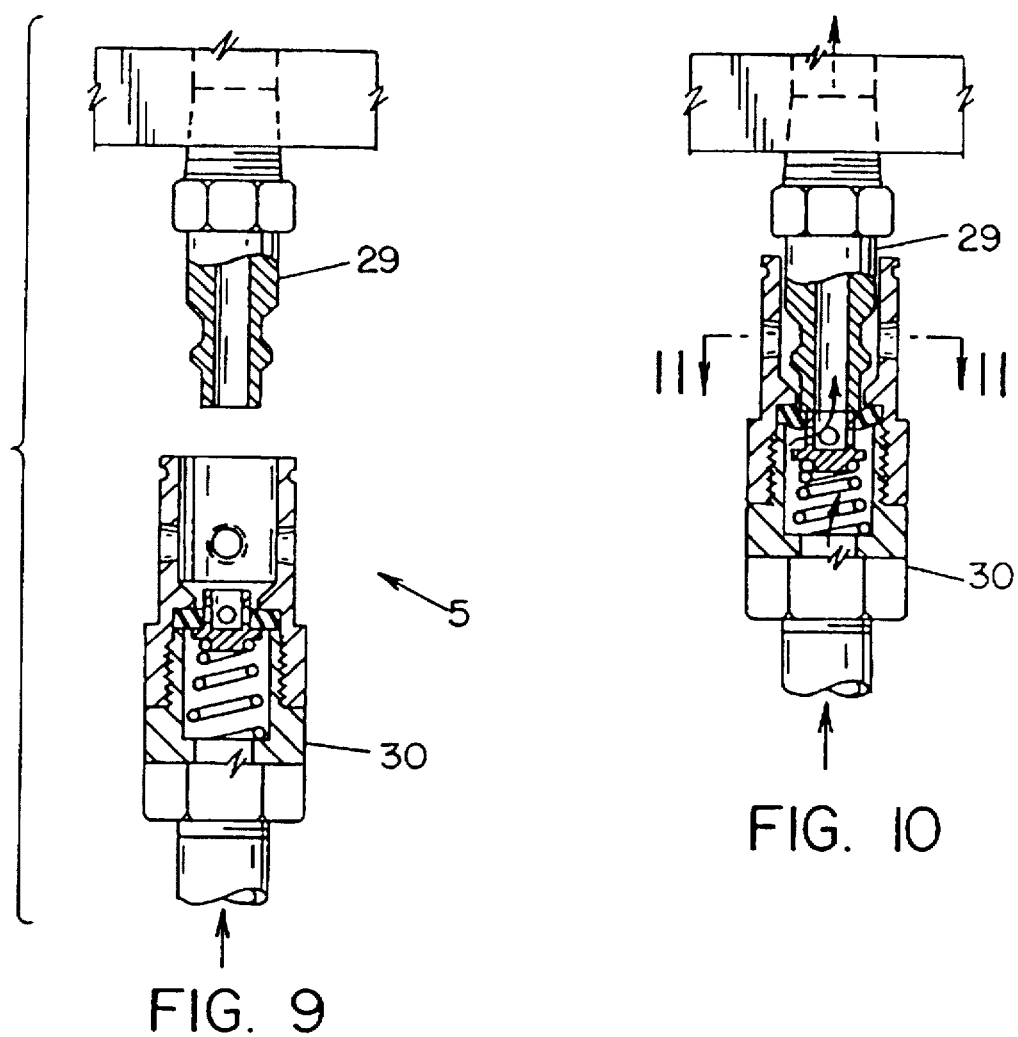
FIG. 9 is a sectional view of one of the quick disconnects shown with the locking balls removed and without its retractable sleeve.
FIG. 10 is a sectional view of the quick disconnect of FIG. 9 shown during engagement.
Figure 11:
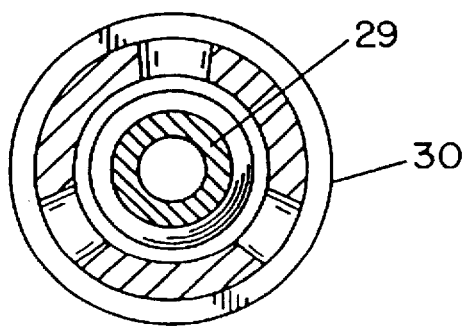
FIG. 11 is a sectional view taken along lines 11—11 as indicated in FIG. 10.
Figure 12:
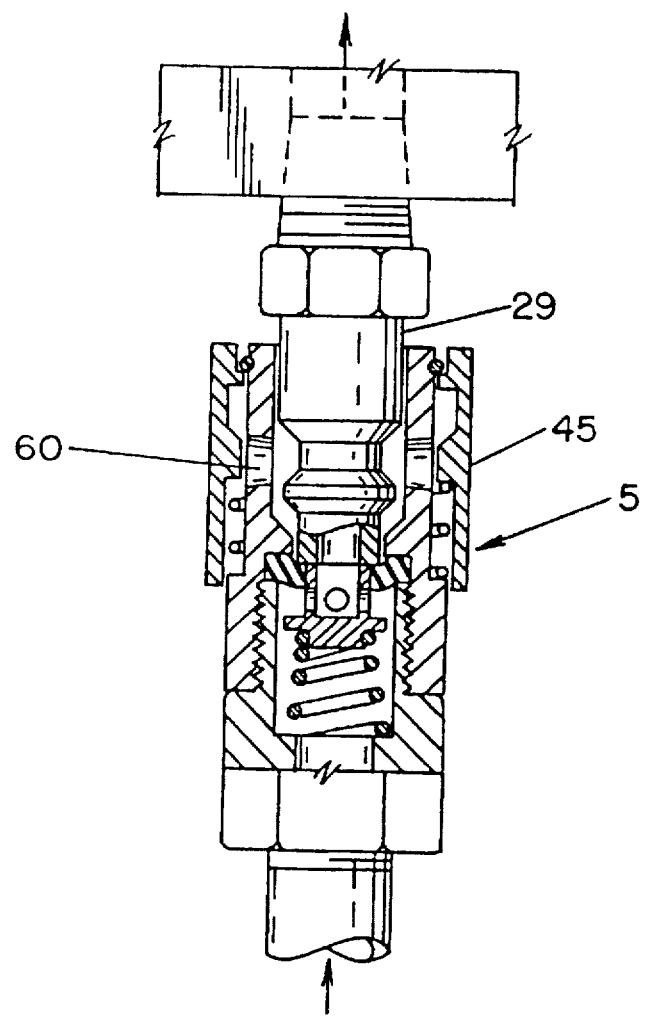
FIG. 12 is a sectional view of the quick disconnect of FIGS. 9 and 10 shown with its retractable sleeve and spring.

The first and second quick disconnects (5,6) used in the preferred embodiment of the present invention have been specially adapted so as to permit engagement of the male and female halves of the quick disconnects. Specifically, the locking balls have been removed from the female halves 32, 30 of the quick disconnects 5, 6 enabling engagement of the male halves 29, 31 without retraction of a sleeve which normally reside over the balls. FIGS. 9, 10 and 11 depict a quick disconnect with its balls removed. The sleeve 45 is not shown in FIGS. 9, 10 and 11. The sleeve 45 is shown in FIG. 12. The balls normally would reside in the apertures 47 of the female halves of the quick disconnect. The ball positions of a coupling having balls are controlled by the sleeve 45. These locking mechanisms are well known in the coupling art. FIGS. 9–12, inclusive, represent both quick disconnects 5, 6, although the reference numerals used therein are for the first quick disconnect 5.

The second mounting block 16 has a first bore 39 and a second bore 40 therethrough. The function of the first bore 39 is to connect the male half of the first quick disconnect 29 to the air supply power conduit 8. The function of the second bore 40 of the second mounting block 16 is to connect and transmit air pressure from the male half of the second quick disconnect 31 to the air supply control conduit 9. The air supply power conduit 8 has first end portion 24 and a second end portion 25 as well as an intermediate portion 26. The first end portion 24 of the air supply power conduit 8 is affixed to the second mounting block 16. The second end portion 25 of the air supply power conduit 8 is affixed to power port 10 of the pneumatic pilot control valve 4. A pressure regulator 27 and a check valve 28 are located in series with said air supply power conduit 8 and, specifically, are located in said intermediate portion 26 of the air supply power conduit 8. See, FIG. 4.

In the preferred embodiment the check valve 28 is located nearer to said second mounting block 16 than the pressure regulator 27. The purpose of this orientation of the check valve 28 and the presssure regulator 27 is to permit air flow into the regulator from the air supply system when the workpiece is being unlocked or unclamped in the vice. Another purpose of the check valve is to prohibit air flow in a direction toward the second mounting block 16 when the workpiece is locked or clamped in said vice.

The air supply control conduit 9 has a first end portion 22 and a second end portion 23. The first end portion 22 is affixed to the second mounting block 16, and the second end portion 23 of the air supply control conduit 9 is affixed to control port 11 of pneumatic pilot control valve 4.

The pallet 38 has the hydraulic vice 2, the pneumatic-hydraulic pressure amplifier 3, the pneumatic control valve 4, the second mounting block 16, the air supply power conduit 8, the air supply control conduit 9, the pressure regulator 27 and the check valve 28 mounted thereto. This enables all of the aforesaid hardware to be inserted into and removed from the machining center along with said pallet. Further benefits of this design will become obvious in the discussion set forth hereinbelow.

Figure 7:
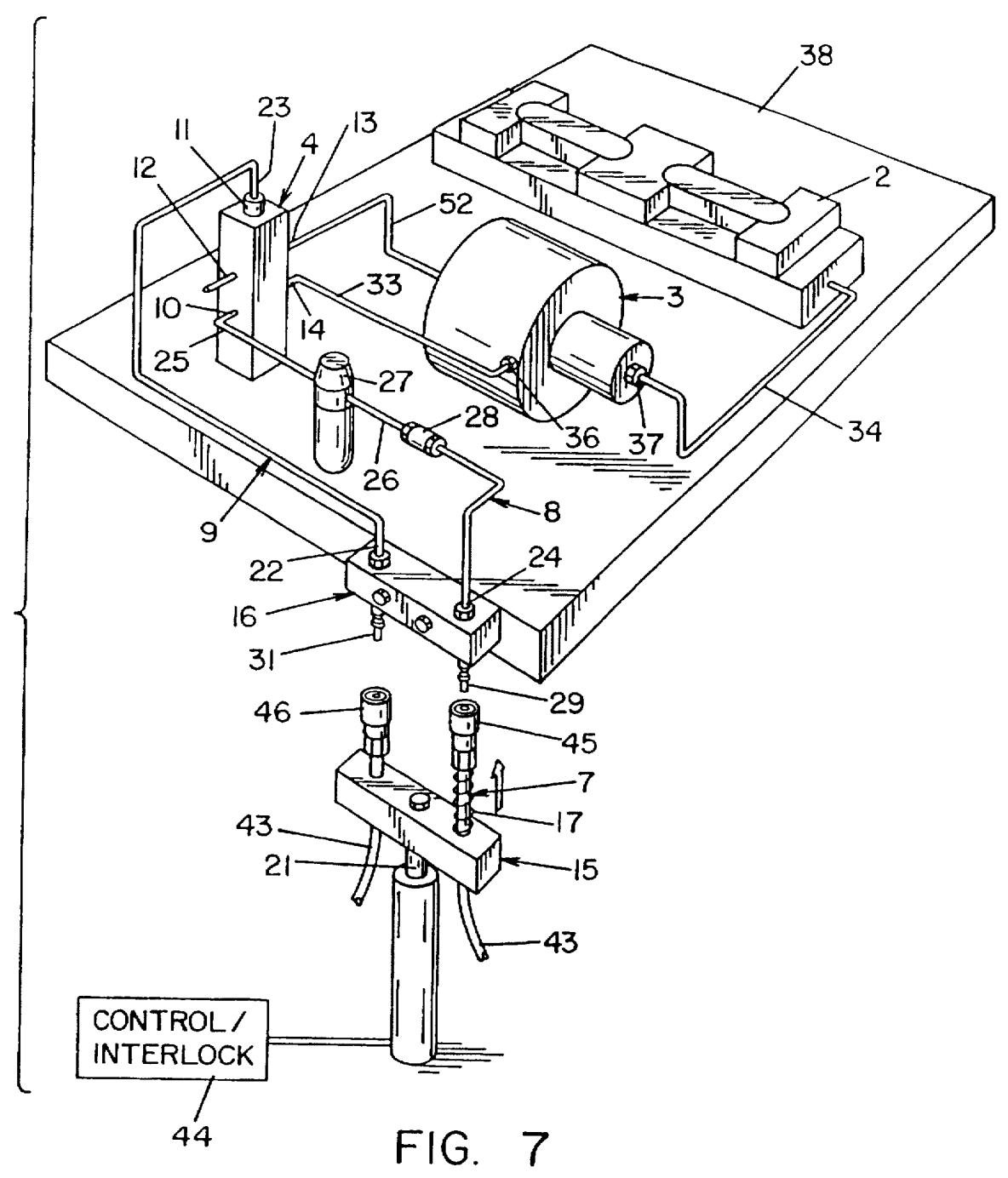

The control and sequencing of air pressure to the male half of the first quick disconnect 29 and the male half of the second quick disconnect 31 and hence, the aforestated ports on the pneumatic pilot control valve 4, is controlled by a first mounting block 15, a first pneumatic conduit 7, also known as a metal conduit guide 7, a spring 17 and the piston 21. The piston 21 is permanently affixed to the first mounting block 15. In the preferred embodiment of the invention the first and second mounting blocks 15, 16 and the piston 21 are oriented in a vertical relationship as shown in FIG. 7. However, it is obvious to those skilled in the art that any orientation of the first and second mounting blocks and the piston which effects the application of air pressure and the sequencing of said air pressure is acceptable.

The piston 21, in the preferred embodiment is pneumatically operated. However, a hydraulically operated piston is perfectly acceptable and could be used. Control/interlock means 39 control the piston. The necessity for said control/interlock means 39 will become apparent from the description of this invention below. The interlock means 39 ensures that the first mounting block 15 and first and second disconnects 30, 32 be totally disconnected from the second mounting block 16 and when the pallet 38 is sent into the vertical machining control center.

The first mounting block 15 has the female half of the second quick disconnect 32 mounted thereon. The first mounting block 15 has a first bore 41 and second bore 42 therethrough. The metal conduit guide 7 has a first end portion 18 and a second end portion 19 and an intermediate portion 20. The metal conduit guide 7 is both a conduit in which air flows and a guide for the female 30 of the first quick disconnect 5. The female half of the first quick disconnect 30 is connected to the first end portion 18 of the metal conduit guide. The air supply system employs flexible pneumatic tubing 43 to supply air pressure to said second end portion 19 of said metal conduit guide 7. The second end portion 19 of the metal conduit guide 7 is affixed to fitting 47. Fitting 47 is also affixed to flexible pneumatic conduit 43. Fitting 47 restrains movement of the female half 30 of the first quick disconnect 5 and the metal conduit guide 7 in the upward direction.

Figure 1:
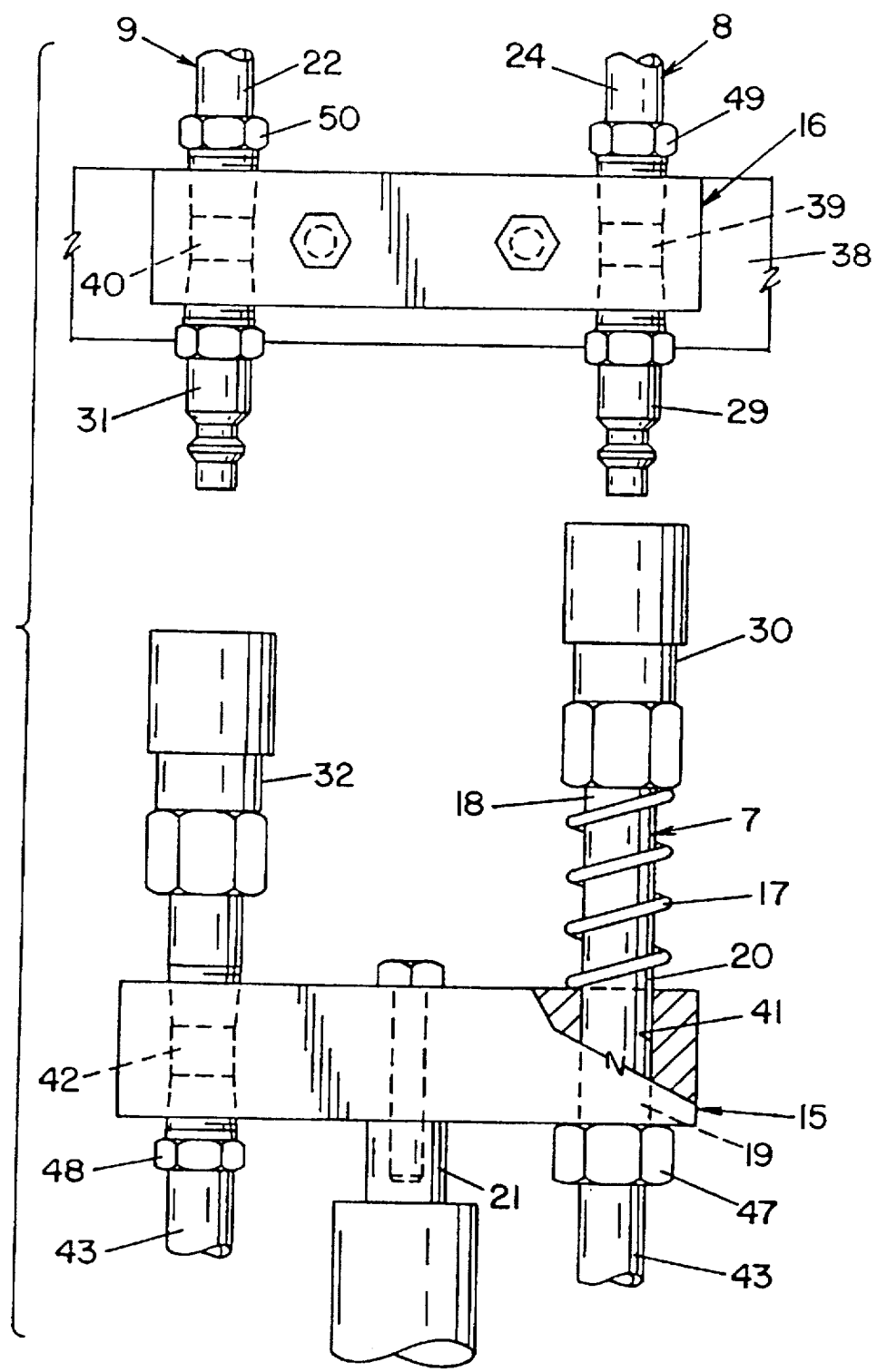
FIG. 1 is a front elevational view of the first and second mounting blocks together with the pneumatic piston including the first and second pneumatic couplings shown completely disengaged.

The intermediate portion of the metal conduit guide resides partially within said first bore 41 of the first mounting block 15. A spring 17 is disposed between the female half of the first quick disconnect 30 and the first mounting block 15 and suspends the female half of the first quick disconnect 30 above the first mounting block 15. This can be seen from FIG. 1 wherein the first and second pneumatic couplings are shown completely disengaged. The female half of the second quick disconnect 32 is affixed to the first mounting block 15 in alignment with the second bore 42 of the first mounting block 15. The second bore 42 in the first mounting block 15 is also connected to the air supply system 1 by means of the flexible pneumatic tubing 43 and a standard fitting 48.

The air supply system 1 and the female half of the second quick disconnect 32 are connected to the first mounting block 15 through standard NPT threads. The metal conduit guide 7 serves as a guide and support for the female half of the first quick disconnect 30.

Figure 2:
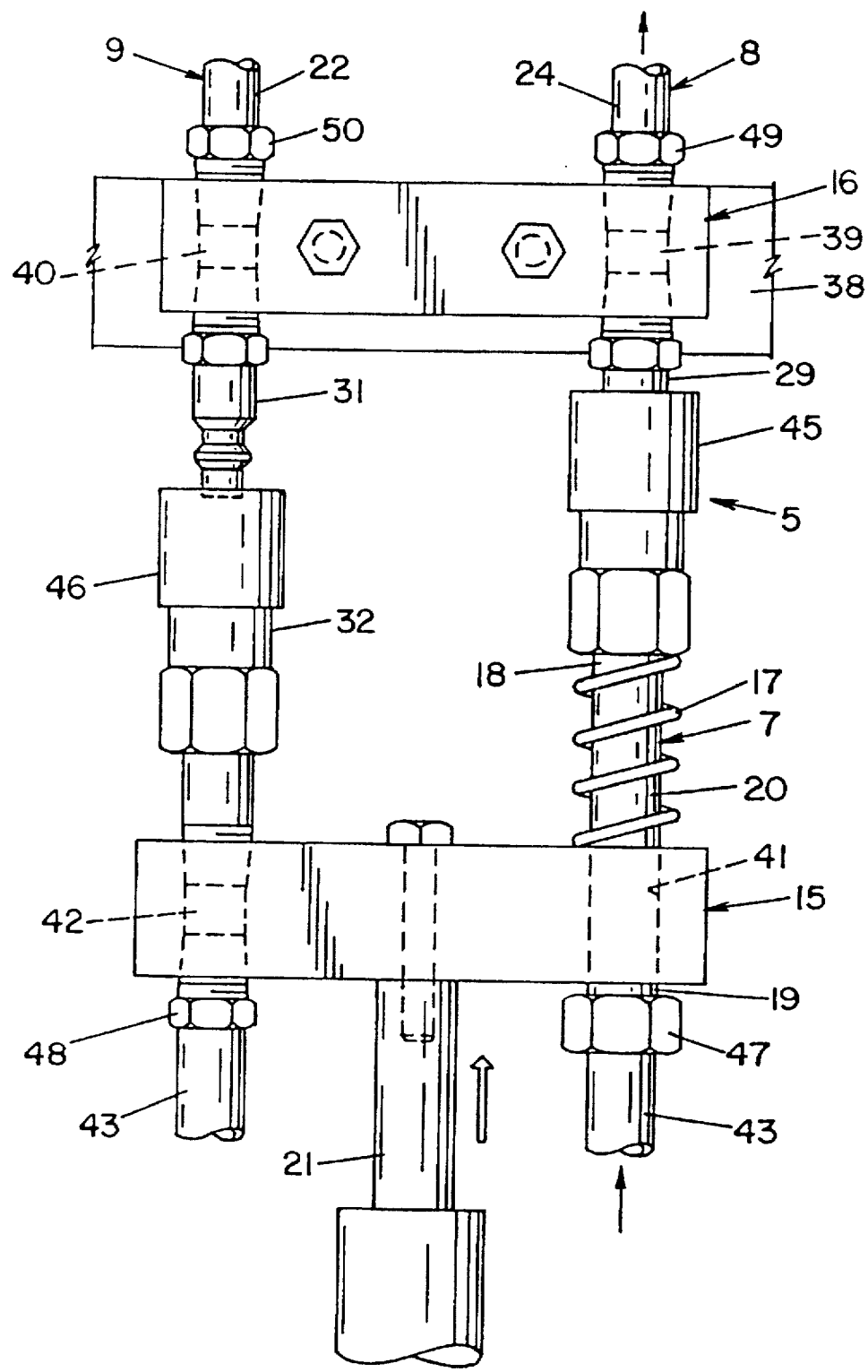
FIG. 2 is a front elevational view of the first and second mounting blocks together with the pneumatic piston including the first and second pneumatic couplings shown with the first pneumatic coupling engaged and with the second pneumatic coupling disengaged.

When the pallet is removed from the machining center, the first and second mounting blocks 15 and 16 respectively, are aligned, the second mounting block 16 is oriented above the first mounting block 15. At this time, the mounting blocks are in the position shown in FIG. 1. The male halves and female halves of the first and second pneumatic couplings are brought together when the pneumatically operated piston 21 is actuated. The first and second pneumatic couplings engage sequentially. The first pneumatic coupling, also known as the first quick disconnect coupling engages before the second pneumatic coupling. This can be seen in FIG. 2 where the first pneumatic coupling is shown engaged and the second pneumatic coupling is disengaged.

Figure 3:
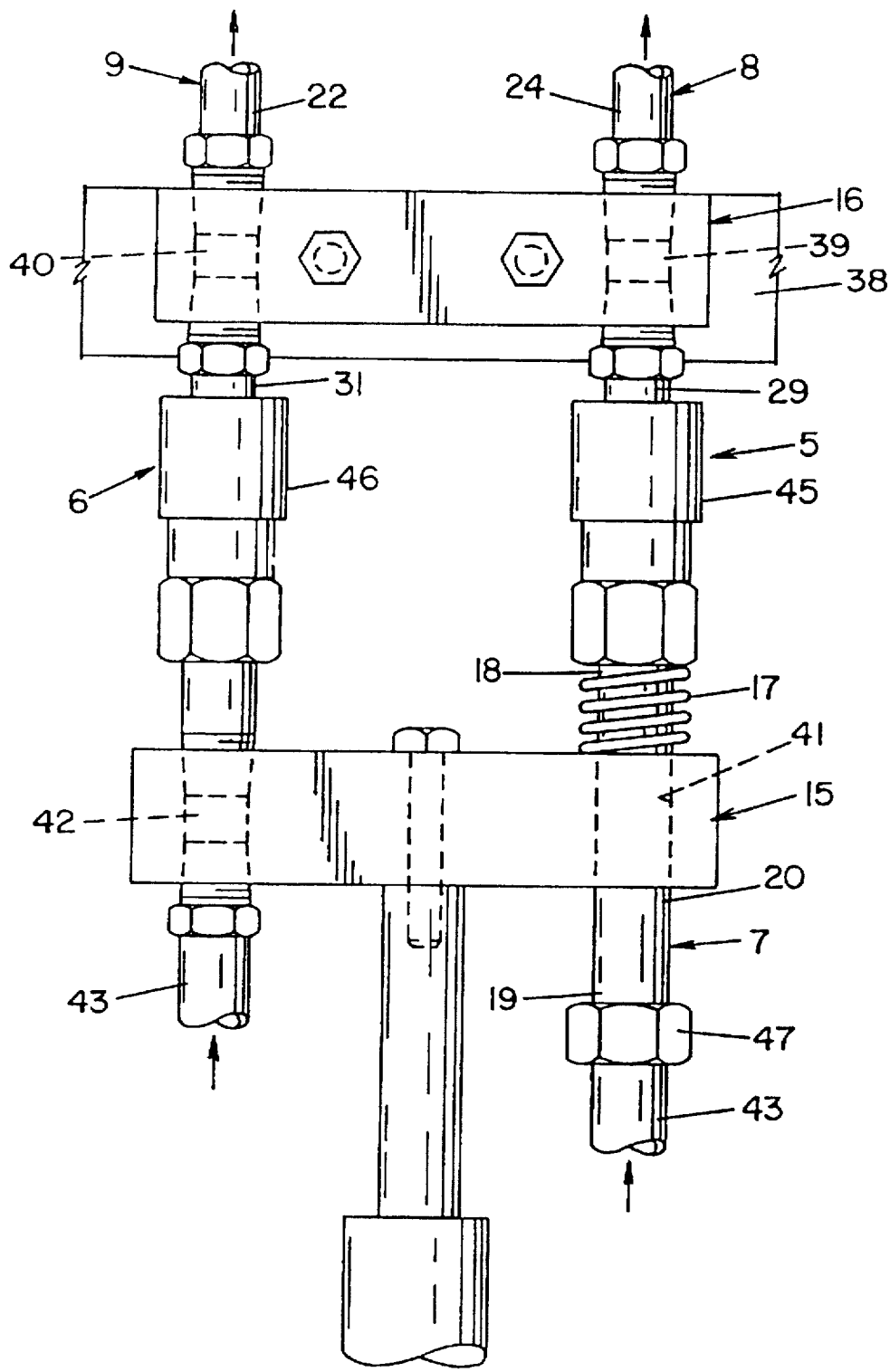
FIG. 3 is a front elevational view of the first and second mounting blocks together with the pneumatic piston including the first and second pneumatic couplings completely engaged.

In FIG. 3 both the first and second pneumatic couplings are shown completely engaged. At this point in time, pilot air is being applied to the control port 11, air pressure is being supplied to the power port 10 and through said pneumatic pilot control valve and out of retraction port 14 of said pilot control valve 4. See, FIG. 6. In turn, pressure is applied to the unclamped port 36 on the amplifier. This causes the hydraulic oil pressure to be relieved from the vice 2. The workpiece is then removed from the pallet if a workpiece is present, and a new workpiece is then inserted into the vice.

The piston is then actuated in the opposite direction pulling the first mounting block 15 away from the second mounting block 16. The second pneumatic coupling, which supplies the control port 11 on the pneumatic control valve, disengages. The spring 17 maintains the female half of the first pneumatic coupling in engagement with the male half of the first pneumatic coupling temporarily until such time as the piston progresses far enough to cause disengagement of the first pneumatic coupling.

It is not necessary that the metal conduit guide 7 be a piece of metal tubing. The preferred embodiment has a metal conduit guide. In an alternate embodiment, a piece of rigid plastic could be used instead of a metal tube.

Figure 8:
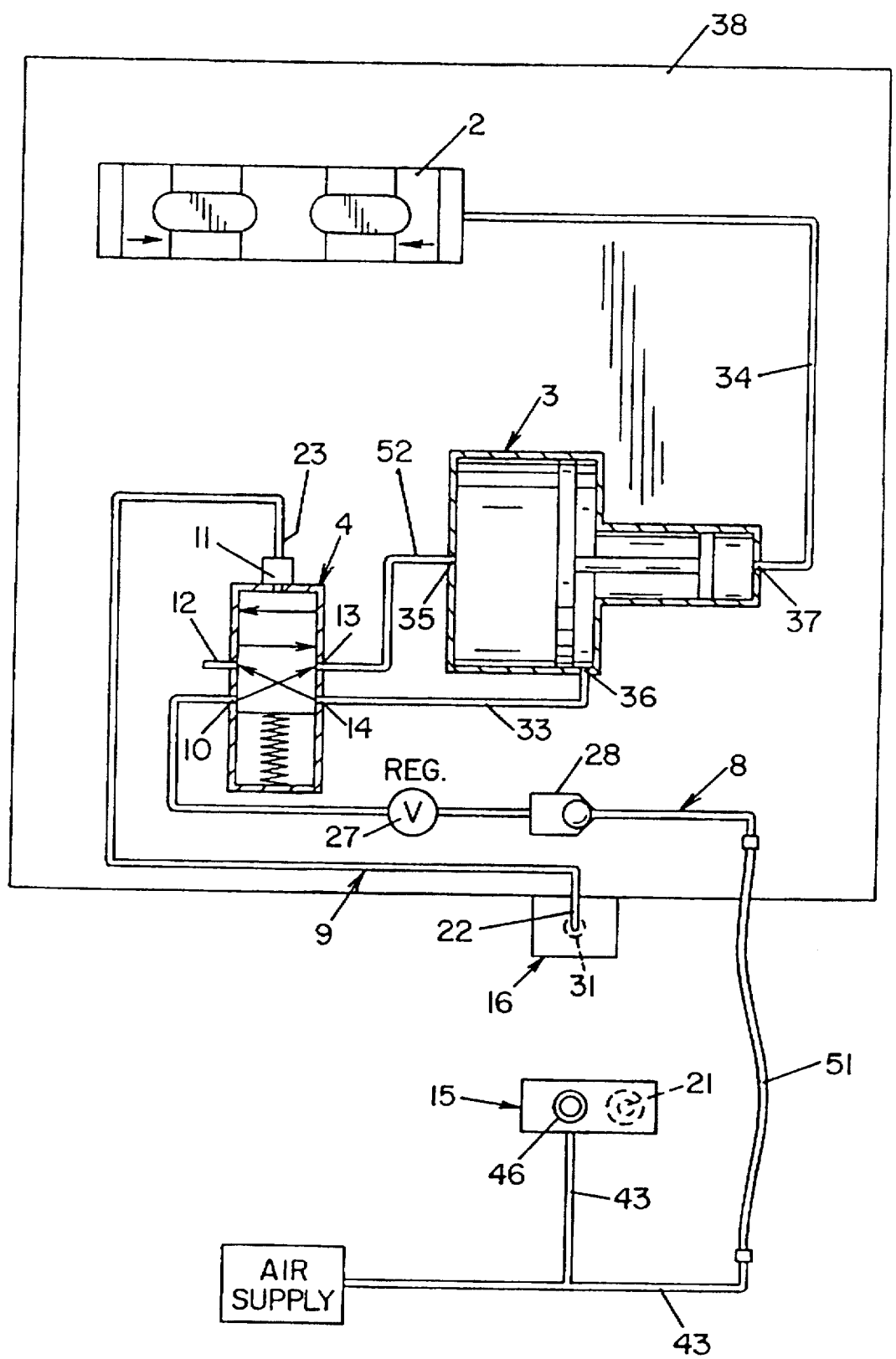
FIG. 8 is schematic diagram of the invention shown with only one coupling, the second pneumatic coupling, air being supplied through the check valve, the pressure regulator, pilot valve and amplifier.

Additionally, another embodiment of the invention involves the maintenance of air pressure at power port 10 on the pneumatic pilot control valve by a long, flexible pneumatic conduit 43. See FIG. 8. In this embodiment, the air pressure supply system could be constantly applied to the power port 10. In this alternate embodiment, the application and removal of the air to the control port 11 on the power control valve 4 would function as it does in the preferred embodiment but there would not be a need for a first pneumatic coupling. This alternate embodiment, however, would be somewhat cumbersome and is not preferred in that a provision and/or a guide for a flexible pneumatic conduit would be necessary to insure smooth and efficient operation of the machining center without tangling the pneumatic tube.

While the invention has been described in combination with embodiments thereof, it is evident that many alternatives, modifications and variations would be apparent to those skilled in the art in light of the foregoing description. Accordingly it is intended to embrace all such alternatives, modifications and variations while within the spirit and the scope of the attendant claims.

What is claimed is:

1. A method for automatically clamping and unclamping a workpiece in a pallet, said method includes a vice means, a pressure amplification means, a pilot valve, said pilot valve having a power port and a control port, and means for applying and removing pressure to said pilot valve, said method comprising the steps of applying pressure sequentially to said power port and then to said control port thereby controlling said amplification means and opening said vice means, positioning said Workpiece in said vice means, and removing pressure sequentially from said control port thereby controlling said amplification means and closing said vice means.

2. A method for automatically unclamping and clamping a workpiece in a pallet using a hydraulic vice, a pneumatic-hydraulic pressure amplifier, said amplifier having a clamped port and an unclamped port, a pneumatic pilot valve, said pilot valve having a control port, a power port, an amplification port, a retraction port, and an exhaust port, pressure supply means, and conduit means for communicating between said ports and said pressure supply means, comprising the steps of applying air pressure to said power port of said pilot valve, applying pressure to said control port of said pilot valve, positioning said pilot valve allowing communication between said air pressure supply means, said power port, said retraction port and said unclamped port of said amplifier unlocking said vice, placing a workpiece in said hydraulic vice, removing pressure from said control port of said pilot valve, positioning said pilot valve allowing communication between said air pressure supply means, said power port, said amplification port and said clamped port of said amplifier locking said vice, and maintaining pressure to said power port of said pilot valve.

* * * * *